United States Patent
Zhu et al.

(10) Patent No.: US 12,386,151 B2
(45) Date of Patent: Aug. 12, 2025

(54) CAMERA OPTICAL LENS

(71) Applicant: AAC Optics (Suzhou) Co., Ltd., Suzhou (CN)

(72) Inventors: Yongxiang Zhu, Suzhou (CN); Jia Chen, Suzhou (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 368 days.

(21) Appl. No.: 18/307,815

(22) Filed: Apr. 27, 2023

(65) Prior Publication Data
US 2024/0094505 A1    Mar. 21, 2024

(30) Foreign Application Priority Data
Apr. 28, 2022   (CN) .......................... 202210469491.9

(51) Int. Cl.
*G02B 9/62* (2006.01)
*G02B 13/00* (2006.01)

(52) U.S. Cl.
CPC ........... *G02B 9/62* (2013.01); *G02B 13/0045* (2013.01)

(58) Field of Classification Search
None
See application file for complete search history.

(56) References Cited

U.S. PATENT DOCUMENTS

| | | | |
|---|---|---|---|
| 2020/0110247 A1* | 4/2020 | Jhang | G02B 13/0045 |
| 2020/0249439 A1* | 8/2020 | Song | G02B 27/0025 |
| 2021/0191082 A1* | 6/2021 | Zhang | G02B 27/0025 |

* cited by examiner

*Primary Examiner* — Kristy A Haupt
(74) *Attorney, Agent, or Firm* — Wiersch Law Group

(57) ABSTRACT

The present disclosure relates to the technical field of optical lens and discloses a camera optical lens. The camera optical lens includes, from an object side to an image side: a first lens having a negative refractive power, a second lens having a negative refractive power, a third lens having a positive refractive power, a fourth lens having a positive refractive power, a fifth lens having a negative refractive power, and a sixth lens having a positive refractive power. The camera optical lens satisfies following conditions: $2.50 \leq f2/f1 \leq 8.00$; $f45/f \leq -5.00$; $1.20 \leq d5/d6 \leq 5.00$; and $-20.00 \leq R6/R5 \leq -2.00$. The camera optical lens has outstanding optical functions, while satisfying a desire of wide angle and ultra-thinness.

11 Claims, 8 Drawing Sheets

CAMERA OPTICAL LENS

TECHNICAL FIELD

The present disclosure relates to the field of optical lens, in particular, to a camera optical lens suitable for handheld devices, such as smart phones and digital cameras, and imaging devices, such as monitors, PC lenses or vehicle-mounted lenses.

BACKGROUND

With the emergence of various smart devices in recent years, the demand for miniature camera optical lens is increasing day by day, and as the pixel size of the photosensitive devices become smaller, plus the current development trend of electronic products towards better functions and thinner and portable dimensions, miniature camera optical lens with good imaging quality therefore have become a mainstream in the market. In order to obtain better imaging quality, the lens generally adopts a multi-piece lens structure. Also, with the development of technology and the increase of the diverse demands of users, and as the pixel area of photosensitive devices is becoming smaller and smaller and the requirement of the system on the imaging quality is improving constantly, the six-piece lens structure gradually appear in lens designs. There is an urgent need for long-focal-length camera lenses with good optical characteristics, small size and fully corrected aberration.

SUMMARY

To address the above issues, the present disclosure seeks to provide a camera optical lens that satisfies a design requirement of large aperture, ultra-wide angle and miniaturization while having outstanding optical functions.

In order to address the above issues, embodiments of the present disclosure provide a camera optical lens including, from an object side to an image side: a first lens having a negative refractive power; a second lens having a negative refractive power; a third lens having a positive refractive power; a fourth lens having a positive refractive power; a fifth lens having a negative refractive power; and a sixth lens having a positive refractive power.

Herein, the camera optical lens satisfies following conditions: $2.50 \leq f2/f1 \leq 18.00$; $f45/f \leq -5.00$; $1.20 \leq d5/d6 \leq 5.00$; and $-20.00 \leq R6/R5 \leq -2.00$; where f denotes a focal length of the camera optical lens; f1 denotes a focal length of the first lens; f2 denotes a focal length of the second lens; f45 denotes a combined focal length of the fourth lens and the fifth lens; d5 denotes an on-axis thickness of the third lens; d6 denotes an on-axis distance from an image-side surface of the third lens to an object-side surface of the fourth lens; R5 denotes a central curvature radius of an object-side surface of the third lens; and R6 denotes a central curvature radius of the image-side surface of the third lens.

As an improvement, the camera optical lens further satisfies the following condition: $10.00 \leq d2/d4 \leq 50.00$; where d2 denotes an on-axis distance from an image-side surface of the first lens to an object-side surface of the second lens; and d4 denotes an on-axis distance from an image-side surface of the second lens to the object-side surface of the third lens.

As an improvement, the camera optical lens further satisfies the following condition: $0.00 \leq (R11+R12)/(R11-R12) < 1.00$; where R11 denotes a central curvature radius of an object-side surface of the sixth lens; and R12 denotes a central curvature radius of an image-side surface of the sixth lens.

As an improvement, the camera optical lens further satisfies the following condition: $EFL/IH \leq 1.00$; where EFL denotes an effective focal length of the camera optical lens; and IH denotes an image height of the camera optical lens.

As an improvement, an object-side surface of the first lens is convex in a paraxial region and an image-side surface of the first lens is concave in the paraxial region; and the camera optical lens further satisfies following conditions: $-4.02 \leq f1/f \leq -1.09$; $0.60 \leq (R1+R2)/(R1-R2) \leq 2.14$; and $0.01 \leq d1/TTL \leq 0.09$; where TTL denotes a total optical length from the object-side surface of the first lens to an image surface of the camera optical lens along an optical axis; R1 denotes a central curvature radius of the object-side surface of the first lens; R2 denotes a central curvature radius of the image-side surface of the first lens; and d1 denotes an on-axis thickness of the first lens.

As an improvement, an object-side surface of the second lens is concave in a paraxial region and an image-side surface of the second lens is convex in the paraxial region; and the camera optical lens further satisfies following conditions: $-29.45 \leq f2/f \leq -3.38$; $-10.81 \leq (R3+R4)/(R3-R4) \leq -1.77$; and $0.06 \leq d3/TTL \leq 0.27$; where TTL denotes a total optical length from an object-side surface of the first lens to an image surface of the camera optical lens along an optical axis; R3 denotes a central curvature radius of the object-side surface of the second lens; R4 denotes a central curvature radius of the image-side surface of the second lens; and d3 denotes an on-axis thickness of the second lens.

As an improvement, the object-side surface of the third lens is convex in a paraxial region and the image-side surface of the third lens is concave in the paraxial region; and the camera optical lens further satisfies following conditions: $1.01 \leq f3/f \leq 4.37$; $-1.81 \leq (R5+R6)/(R5-R6) \leq -0.23$; and $0.05 \leq d5/TTL \leq 0.18$; where TTL denotes a total optical length from an object-side surface of the first lens to an image surface of the camera optical lens along an optical axis; and f3 denotes a focal length of the third lens.

As an improvement, an object-side surface of the fourth lens is convex in a paraxial region and an image-side surface of the fourth lens is convex in the paraxial region; and the camera optical lens further satisfies following conditions: $0.82 \leq f4/f \leq 2.62$; $0 \leq (R7+R8)/(R7-R8) \leq 0.14$; and $0.02 \leq d7/TTL \leq 0.14$; where TTL denotes a total optical length from an object-side surface of the first lens to an image surface of the camera optical lens along an optical axis; f4 denotes a focal length of the fourth lens; R7 denotes a central curvature radius of the object-side surface of the fourth lens; R8 denotes a central curvature radius of the image-side surface of the fourth lens; and d7 denotes an on-axis thickness of the fourth lens.

As an improvement, an object-side surface of the fifth lens is concave in a paraxial region and an image-side surface of the fifth lens is concave in the paraxial region, and the camera optical lens further satisfies following conditions: $-3.05 \leq f5/f \leq -0.80$; $-1.09 \leq (R9+R10)/(R9-R10) \leq -0.14$; and $0.01 \leq d9/TTL \leq 0.04$ where TTL denotes a total optical length from an object-side surface of the first lens to an image surface of the camera optical lens along an optical axis; f4 denotes a focal length of the fifth lens; R9 denotes a central curvature radius of the object-side surface of the fifth lens; R10 denotes a central curvature radius of the image-side surface of the fifth lens; and d9 denotes an on-axis thickness of the fifth lens.

As an improvement, an object-side surface of the sixth lens is convex in a paraxial region and an image-side surface of the sixth lens is convex in the paraxial region, and the camera optical lens further satisfies following conditions: $1.11 \leq f6/f \leq 4.61$; and $0.02 \leq d11/TTL \leq 0.09$; where TTL denotes a total optical length from an object-side surface of the first lens to an image surface of the camera optical lens along an optical axis; f6 denotes a focal length of the sixth lens; and d11 denotes an on-axis thickness of the sixth lens.

As an improvement, the first lens, the second lens, the third lens, the fourth lens, the fifth lens and the sixth lens are glass.

The present disclosure is advantageous in: the camera optical lens according to the present disclosure has good optical characteristics, has characteristics of wide angle and ultra-thinness, and is especially fit for a mobile phone camera optical lens component and a WEB camera lens composed by such camera elements as a charge coupled device (CCD) and a complementary metal oxide semiconductor (CMOS) for high pixels.

BRIEF DESCRIPTION OF DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. For those skilled in the art, other drawings may also be obtained in accordance with the drawings without any inventive effort.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
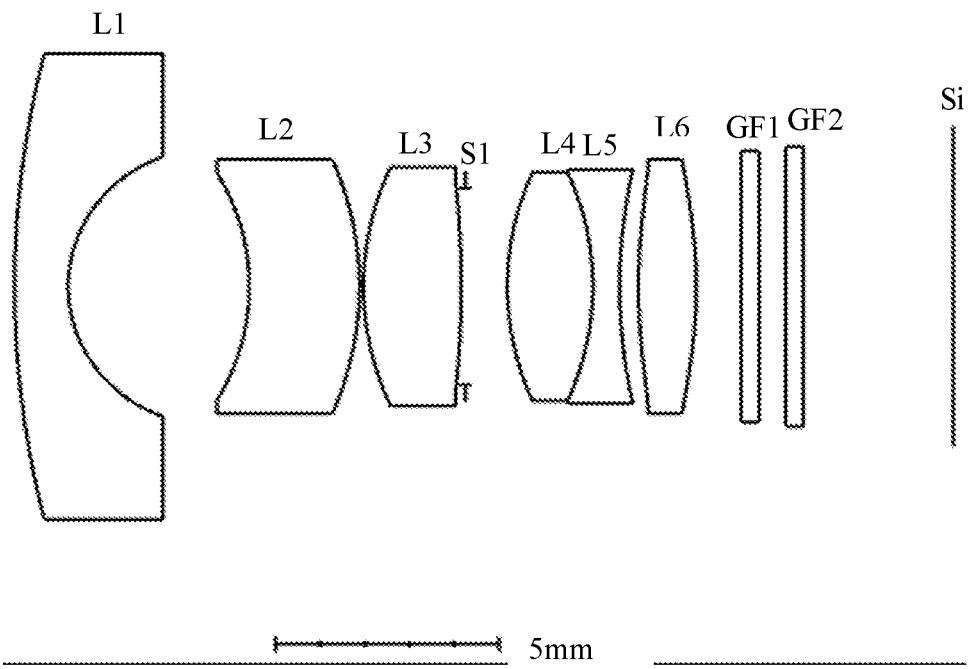
FIG. 1 is a schematic diagram of a structure of a camera optical lens according to Embodiment 1 of the present disclosure.

Referring to the accompanying drawings, the present disclosure provides a camera optical lens 10. FIG. 1 shows the camera optical lens 10 of Embodiment 1 of the present disclosure, and the camera optical lens 10 includes six lenses. Specifically, the camera optical lens 10 includes, from an object side to an image side: a first lens L1, a second lens L2, a third lens L3, an aperture S1, a fourth lens L4, a fifth lens L5 and a sixth lens L6. An optical element such as an optical filter GF can be arranged between the sixth lens L6 and an image surface S1.

In an embodiment, object-side surfaces and image-side surfaces of the first lens L1, the second lens L2, the third lens L3, the fourth lens L4 and the fifth lens L5 are all spherical surfaces. A surface of the sixth lens L6 is an aspheric surface. By designing some lenses as spherical-surface lenses, difficulty in manufacturing of the lenses may be reduced.

In an embodiment, the first lens L1, the second lens L2, the third lens L3, the fourth lens L4, the fifth lens L5 and the sixth lens L6 are glass. Glass lenses may improve optical performance of a system. In an alternative embodiment, the lenses may be other materials.

In an embodiment, a focal length of the first lens L1 is defined as f1, a focal length of the second lens L2 is defined as f2, and the camera optical lens 10 satisfies a condition of $2.50 \leq f2/f1 \leq 8.00$, which specifies a ratio of the focal length f2 of the second lens L2 and the focal length f1 of the first lens L1. Through reasonable distribution of focal lengths, the system may have good imaging quality and lower sensitivity.

In an embodiment, a focal length of the camera optical lens 10 is defined as f, a combined focal length of the fourth lens L4 and the fifth lens L5 is defined as f45, and the camera optical lens 10 satisfies a condition of $f45/f \leq -5.00$, which specifies a ratio of the combined focal length of the fourth lens L4 and the fifth lens L5 and the focal length of the camera optical lens 10. Within this range, field curvatures of the camera optical lens 10 may effectively be balanced so that a field curvature offset of a central field is less than 10 μm.

In an embodiment, an on-axis thickness of the third lens L3 is defined as d5, an on-axis distance from an image-side surface of the third lens L3 to an object-side surface of the fourth lens L4 is defined as d6, and the camera optical lens 10 satisfies a condition of $1.20 \leq d5/d6 \leq 5.00$, which specifies a ratio of the thickness of the third lens L3 and a space between the third lens L3 and the fourth lens L4. This range facilitates shortening a total optical length of the system so as to achieve ultra-thinness.

In an embodiment, a central curvature radius of an object-side surface of the third lens L3 is defined as R5, a central curvature radius of the image-side surface of the third lens L3 is defined as R6, and the camera optical lens 10 further satisfies a condition of −20.00≤R6/R5≤−2.00, which specifies a shape of the third lens L3, reduces deflection of light, and effectively corrects chromatic aberration so that the chromatic aberration is satisfies a condition of |LC|≤8.0 µm.

In an embodiment, an on-axis distance from an image-side surface of the first lens L1 to an object-side surface of the second lens L2 is defined as d2, an on-axis distance from an image-side surface of the second lens L2 to the object-side surface of the third lens L3 is defined as d4, and the camera optical lens 10 satisfies a condition of 10.00≤d2/d4≤50.00, which specifies a ratio of a space between the first lens L1 and the second lens L2 and a space between the second lens L2 and the third lens L3. This range facilitates shortening a total optical length of the system so as to achieve ultra-thinness.

In an embodiment, a central curvature radius of an object-side surface of the sixth lens L6 is defined as R11, and a central curvature radius of an image-side surface of the sixth lens L6 is defined as R12, and the camera optical lens 10 satisfies a condition of 0.00≤(R11+R12)/(R11−R12)≤1.00, which specifies a shape of the sixth lens L6. This facilitates correcting astigmatism and distortion of the camera optical lens, so that the distortion satisfies a condition of |Distortion|≤65% and possibility of generation of vignetting is reduced.

In an embodiment, an effective focal length of the camera optical lens is defined as EFL, an image height of the camera optical lens is defined as IH, and the camera optical lens 10 satisfies a condition of EFL/IH≤1.00, which specifies a ratio of a total system focal length and a total system length. This range facilitates achieving ultra-thinness.

In an embodiment, the object-side surface of the first lens L1 is convex in a paraxial region, and an image-side surface of the first lens L1 is concave in the paraxial region. The first lens L1 has a negative refractive power. In an alternative embodiment, the object-side surface and the image-side surface of the first lens L1 may be set as other distribution conditions of concave and convex surfaces.

The focal length of the first lens L1 is defined as f1, and the camera optical lens 10 satisfies a condition of −4.02≤f1/f≤−1.09, which specifies a ratio of the focal length f1 of the first lens L1 and the focal length f of the camera optical lens 10. This range facilitates achieving ultra-wide-angle lenses. Preferably, the camera optical lens 10 satisfies a condition of −2.52≤f1/f≤−1.36.

A central curvature radius of the object-side surface of the first lens L1 is defined as R1, a central curvature radius of the image-side surface of the first lens L1 is defined as R2, and the camera optical lens 10 satisfies a condition of 0.60≤(R1+R2)/(R1−R2)≤2.14. By reasonably controlling a shape of the first lens L1, the first lens L1 may effectively correct spherical aberration of the system. Preferably, the camera optical lens 10 satisfies a condition of 0.97≤(R1+R2)/(R1−R2)≤1.71.

An on-axis thickness of the first lens L1 is defined as d1, a total optical length of the camera optical lens 10 from the object-side surface of the first lens to an image surface of the camera optical lens along an optical axis is defined as TTL, and the camera optical lens 10 satisfies a condition of 0.01≤d1/TTL≤0.09. This range facilitates achieving miniaturization. Preferably, the camera optical lens 10 satisfies a condition of 0.02≤d1/TTL≤0.07.

In an embodiment, an object-side surface of the second lens L2 is concave in the paraxial region, an image-side surface of the second lens L2 is convex in the paraxial region, and the second lens L2 has a negative refractive power. In an alternative embodiment, the object-side surface and image-side surface of the second lens L2 may be set as other distribution conditions of concave and convex surfaces.

The focal length of the second lens L2 is defined as f2, and the camera optical lens 10 further satisfies a condition of −29.45≤f2/f≤−3.38. By controlling a negative refractive power of the second lens L2 within a reasonable range, correction of the aberration of the optical system may be achieved. Preferably, the camera optical lens 10 further satisfies a condition of −18.40≤f2/f≤−4.23.

A central curvature radius of the object-side surface of the second lens L2 is defined as R3, a central curvature radius of an image-side surface of the second lens L2 is defined as R4, and the camera optical lens 10 further satisfies a condition of −10.81≤(R3+R4)/(R3−R4)≤−1.77, which specifies a shape of the second lens L2. With a development towards ultra-thin and wide-angle lenses, this range facilitates correcting a problem of off-axis aberration. Preferably, the camera optical lens 10 further satisfies a condition of −6.76≤(R3+R4)/(R3−R4)≤−2.22.

An on-axis thickness of the second lens L2 is defines as d3, and the camera optical lens 10 further satisfies a condition of 0.06≤d3/TTL≤0.27. This can facilitate achieving miniaturization. Preferably, the camera optical lens 10 further satisfies a condition of 0.09≤d3/TTL≤0.22.

In an embodiment, an object-side surface of the third lens L3 is convex in the paraxial region, an image-side surface of the third lens L3 is convex in the paraxial region, and the third lens L3 has a positive refractive power. In an alternative embodiment, the object-side surface and image-side surface of the third lens L3 may be set as other distribution conditions of concave and convex surfaces.

A focal length of the third lens L3 is defined as f3, and the camera optical lens 10 further satisfies a condition of 1.01≤f3/f≤4.37. An appropriate distribution of the refractive power leads to a better imaging quality and a lower sensitivity of the system. Preferably, the camera optical lens 10 further satisfies a condition of 1.61≤f3/f≤3.49.

A central curvature radius of the object-side surface of the third lens L3 is defined as R5, a central curvature radius of the image-side surface of the third lens L3 is defined as R6, and the camera optical lens 10 further satisfies a condition of −1.81≤(R5+R6)/(R5−R6)≤−0.23. This can effectively control a shape of the third lens L3.

With a development towards ultra-thin and wide-angle lenses, this range facilitates correcting the problem of off-axis aberration. Preferably, the camera optical lens 10 further satisfies a condition of −1.13≤(R5+R6)/(R5−R6)≤−0.28.

An on-axis thickness of the third lens L3 is defined as d5, and the camera optical lens 10 further satisfies a condition of 0.05≤d5/TTL≤0.18. This can facilitate achieving miniaturization. Preferably, the camera optical lens 10 further satisfies a condition of 0.08≤d5/TTL≤0.15.

In an embodiment, an object-side surface of the fourth lens L4 is convex in the paraxial region, an image-side surface of the fourth lens L4 is convex in the paraxial region, and the fourth lens L4 has a positive refractive power. In an alternative embodiment, the object-side surface and image-side surface of the fourth lens L4 may be set as other distribution conditions of concave and convex surfaces.

A focal length of the fourth lens L4 is defined as f4, and the camera optical lens 10 further satisfies a condition of $0.82 \leq f4/f \leq 2.62$. The appropriate distribution of refractive power makes the system have better imaging quality and lower sensitivity. Preferably, the camera optical lens 10 further satisfies a condition of $1.32 \leq f4/f \leq 2.10$.

A central curvature radius of the object-side surface of the fourth lens L4 is defined as R7, a central curvature radius of the image-side surface of the fourth lens L4 is defined as R8, and the camera optical lens 10 further satisfies a condition of $0 \leq (R7+R8)/(R7-R8) \leq 0.14$, which specifies a shape of the fourth lens L4. With a development towards ultra-thin and long-focal-length lenses, this range facilitates correcting a problem like an off-axis aberration. Preferably, the camera optical lens 10 further satisfies a condition of $0 \leq (R7+R8)/(R7-R8) \leq 0.11$.

An on-axis thickness of the fourth lens L4 is defined as d7, and the camera optical lens 10 further satisfies a condition of $0.02 \leq d7/TTL \leq 0.14$. This can facilitate achieving miniaturization. Preferably, the camera optical lens 10 further satisfies a condition of $0.04 \leq d7/TTL \leq 0.11$.

In an embodiment, an object-side surface of the fifth lens L5 is concave in the paraxial region, an image-side surface of the fifth lens L5 is concave in the paraxial region, and the fifth lens L5 has a negative refractive power. In an alternative embodiment, the object-side surface and image-side surface of the fifth lens L5 may be set as other distribution conditions of concave and convex surfaces.

A focal length of the fifth lens L5 is defined as f5, and the camera optical lens 10 further satisfies a condition of $-3.05 \leq f5/f \leq -0.80$. Through reasonable distribution of refractive powers, the system may have better imaging quality and lower sensitivity. Preferably, the camera optical lens 10 further satisfies a condition of $-1.90 \leq f5/f \leq -1.00$.

A central curvature radius of the object-side surface of the fifth lens L5 is defined as R9, a central curvature radius of the image-side surface of the fifth lens L5 is defined as R10, and the camera optical lens 10 further satisfies a condition of $-1.09 \leq (R9+R10)/(R9-R10) \leq -0.14$, which specifies a shape of the fifth lens L5. With a development towards ultra-thin and wide-angle lenses, this range facilitates correcting a problem of the off-axis aberration. Preferably, the camera optical lens 10 further satisfies a condition of $-0.68 \leq (R9+R10)/(R9-R10) \leq -0.18$.

An on-axis thickness of the fifth lens L5 is defined as d9, and the camera optical lens 10 further satisfies a condition of $0.01 \leq d9/TTL \leq 0.04$. This range facilitates achieving miniaturization. Preferably, the camera optical lens 10 further satisfies a condition of $0.02 \leq d9/TTL \leq 0.03$.

In an embodiment, an object-side surface of the sixth lens L6 is convex in the paraxial region, an image-side surface of the sixth lens L6 is convex in the paraxial region, and the sixth lens L6 has a positive refractive power. In an alternative embodiment, the object-side surface and image-side surface of the sixth lens L6 may be set as other distribution conditions of concave and convex surfaces.

A focal length of the sixth lens L6 is defined as f6, and the camera optical lens 10 further satisfies a condition of $1.11 \leq f6/f \leq 4.61$. The appropriate distribution of refractive power makes the system have better imaging quality and lower sensitivity. Preferably, the camera optical lens 10 further satisfies a condition of $1.78 \leq f6/f \leq 3.69$.

An on-axis thickness of the sixth lens L6 is defined as d11, and the camera optical lens 10 further satisfies a condition of $0.02 \leq d11/TTL \leq 0.09$. This range facilitates achieving miniaturization. Preferably, the camera optical lens 10 further satisfies a condition of $0.03 \leq d11/TTL \leq 0.07$.

In an embodiment, an F number of the camera optical lens 10 is FNO which is less than or equal to 1.8. Thus, the camera optical lens 10 has a large aperture and a better imaging performance.

The camera optical lens 10 has outstanding optical functions, while satisfying a design of large aperture, ultra-wide angle and miniaturization. According to characteristics of the camera optical lens 10, the camera optical lens 10 is especially fit for a mobile phone camera optical lens component and a WEB camera lens composed by such camera elements as a charge coupled device (CCD) and a complementary metal oxide semiconductor (CMOS) for high pixels.

In the following, examples will be used to describe the camera optical lens 10 of the present disclosure. The symbols recorded in each example will be described as follows. The focal length, on-axis distance, central curvature radius, on-axis thickness, inflexion point position, and arrest point position are all in units of mm.

TTL: Total optical length (on-axis distance from the object-side surface of the first lens L1 to the image surface Si) of the camera optical lens 10 in mm.

F number FNO: A ratio of an effective focal length of the camera optical length and an entrance pupil diameter.

Preferably, inflexion points and/or arrest points can be arranged on the object-side surface and/or the image-side surface of the lens, so as to satisfy the demand for high quality imaging. The description below can be referred for specific implementations.

The design data of the camera optical lens 10 in Embodiment 1 of the present disclosure are shown in Table 1 and Table 2.

TABLE 1

|  | R |  | d | nd |  | vd |  |
|---|---|---|---|---|---|---|---|
| S1 | ∞ | d0= | −10.091 |  |  |  |  |
| R1 | 22.278 | d1= | 1.200 | nd1 | 1.6968 | v1 | 55.53 |
| R2 | 3.212 | d2= | 4.052 |  |  |  |  |
| R3 | −5.165 | d3= | 2.462 | nd2 | 1.8348 | v2 | 42.73 |
| R4 | −7.509 | d4= | 0.090 |  |  |  |  |
| R5 | 6.644 | d5= | 2.188 | nd3 | 1.6477 | v3 | 33.84 |
| R6 | −23.524 | d6= | 1.031 |  |  |  |  |
| R7 | 6.525 | d7= | 1.912 | nd4 | 1.6204 | v4 | 60.37 |
| R8 | −6.525 | d8= | 0.000 |  |  |  |  |
| R9 | −6.525 | d9= | 0.600 | nd5 | 1.9525 | v5 | 20.36 |
| R10 | 12.580 | d10= | 0.420 |  |  |  |  |
| R11 | 13.092 | d11= | 1.295 | nd6 | 1.8017 | v6 | 40.63 |
| R12 | −11.236 | d12= | 1.000 |  |  |  |  |
| R13 | ∞ | d13= | 0.400 | ndg1 | 1.5233 | vg1 | 54.52 |
| R14 | ∞ | d14= | 0.600 |  |  |  |  |
| R15 | ∞ | d15= | 0.400 | ndg2 | 1.5168 | vg2 | 64.17 |
| R16 | ∞ | d16= | 3.352 |  |  |  |  |

In the table, meanings of various symbols will be described as follows.

S1: aperture;
R: curvature radius at a center an optical surface;
R1: central curvature radius of the object-side surface of the first lens L1;
R2: central curvature radius of the image-side surface of the first lens L1;
R3: central curvature radius of the object-side surface of the second lens L2;
R4: central curvature radius of the image-side surface of the second lens L2;

R5: central curvature radius of the object-side surface of the third lens L3;
R6: central curvature radius of the image-side surface of the third lens L3;
R7: central curvature radius of the object-side surface of the fourth lens L4;
R8: central curvature radius of the image-side surface of the fourth lens L4;
R9: central curvature radius of the object-side surface of the fifth lens L5;
R10: central curvature radius of the image-side surface of the fifth lens L5;
R11: central curvature radius of the object-side surface of the sixth lens L6;
R12: central curvature radius of the image-side surface of the sixth lens L6;
R13: central curvature radius of an object-side surface of an optical filter GF1;
R14: central curvature radius of an image-side surface of the optical filter GF1;
R15: central curvature radius of an object-side surface of an optical filter GF2;
R16: central curvature radius of an image-side surface of the optical filter GF2;
d: on-axis thickness of a lens and an on-axis distance between lenses;
d0: on-axis distance from the aperture S1 to the object-side surface of the first lens L1;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the sixth lens L6;
d11: on-axis thickness of the sixth lens L6;
d12: on-axis distance from the image-side surface of the sixth lens L6 to the object-side surface of the optical filter GF;
d13: on-axis thickness of the optical filter GF1;
d14: on-axis distance from the image-side surface to the image surface S1 of the optical filter GF1;
d15: on-axis thickness of the optical filter GF2;
d16: on-axis distance from the image-side surface to the image surface S1 of the optical filter GF2;
nd: refractive index of the d line (the d line is a green light having a wavelength of 550 nm);
nd1: refractive index of the d line of the first lens L1;
nd2: refractive index of the d line of the second lens L2;
nd3: refractive index of the d line of the third lens L3;
nd4: refractive index of the d line of the fourth lens L4;
nd5: refractive index of the d line of the fifth lens L5;
nd6: refractive index of the d line of the sixth lens L6;
ndg1: refractive index of the d line of the optical filter GF 1;
ndg2: refractive index of the d line of the optical filter GF2;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
vg1: abbe number of the optical filter GF1;
vg2: abbe number of the optical filter GF2.

Table 2 shows aspherical surface data of the camera optical lens 10 in Embodiment 1 of the present disclosure.

TABLE 2

| | Conic coefficient | Aspheric surface coefficients | | | | |
|---|---|---|---|---|---|---|
| | k | A4 | A6 | A8 | A10 | A12 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 | 0.0000E+00 |
| R4 | 0.0000E+00 | 0.0000E+00 | 0.0000E+00 | 0.0000E+00 | 0.0000E+00 | 0.0000E+00 |
| R5 | 0.0000E+00 | 0.0000E+00 | 0.0000E+00 | 0.0000E+00 | 0.0000E+00 | 0.0000E+00 |
| R6 | 0.0000E+00 | 0.0000E+00 | 0.0000E+00 | 0.0000E+00 | 0.0000E+00 | 0.0000E+00 |
| R7 | 0.0000E+00 | 0.0000E+00 | 0.0000E+00 | 0.0000E+00 | 0.0000E+00 | 0.0000E+00 |
| R8 | 0.0000E+00 | 0.0000E+00 | 0.0000E+00 | 0.0000E+00 | 0.0000E+00 | 0.0000E+00 |
| R9 | 0.0000E+00 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 | 0.0000E+00 |
| R11 | −2.1765E+01 | 4.1269E−04 | −6.4982E−04 | 3.8697E−04 | −1.6369E−04 | 4.4967E−05 |
| R12 | −1.3188E+01 | 9.5827E−04 | −1.3082E−03 | 8.6609E−04 | −3.4481E−04 | 8.7325E−05 |

| | Conic coefficient | Aspheric surface coefficients | | | |
|---|---|---|---|---|---|
| | k | A14 | A16 | A18 | A20 |
| R1 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 |
| R4 | 0.0000E+00 | 0.0000E+00 | 0.0000E+00 | 0.0000E+00 | 0.0000E+00 |

TABLE 2-continued

| | | | | | |
|---|---|---|---|---|---|
| R5 | 0.0000E+00 | 0.0000E+00 | 0.0000E+00 | 0.0000E+00 | 0.0000E+00 |
| R6 | 0.0000E+00 | 0.0000E+00 | 0.0000E+00 | 0.0000E+00 | 0.0000E+00 |
| R7 | 0.0000E+00 | 0.0000E+00 | 0.0000E+00 | 0.0000E+00 | 0.0000E+00 |
| R8 | 0.0000E+00 | 0.0000E+00 | 0.0000E+00 | 0.0000E+00 | 0.0000E+00 |
| R9 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 |
| R11 | −2.1765E+01 | −8.0175E−06 | 9.0025E−07 | −5.7812E−08 | 1.6125E−09 |
| R12 | −1.3188E+01 | −1.4157E−05 | 1.4261E−06 | −8.1277E−08 | 1.9995E−09 |

For convenience, an aspheric surface of each lens surface is an aspheric surface shown in the below formula (1). However, the present disclosure is not limited to the aspherical polynomials form shown in the formula (1).

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20} \quad (1)$$

Herein, k is a conic coefficient, A4, A6, A8, A10, A12, A14, A16, A18 and A20 are aspheric surface coefficients, c is a curvature at a center of the optical surface, r is a vertical distance from a point on an aspheric surface curve to the optical axis, and z is an aspheric surface depth (a vertical distance between a point on the aspheric surface which is of the distance of r from the optical axis, and a tangent surface that is tangent with a top point of the optical axis of the aspheric surface).

Figure 2:
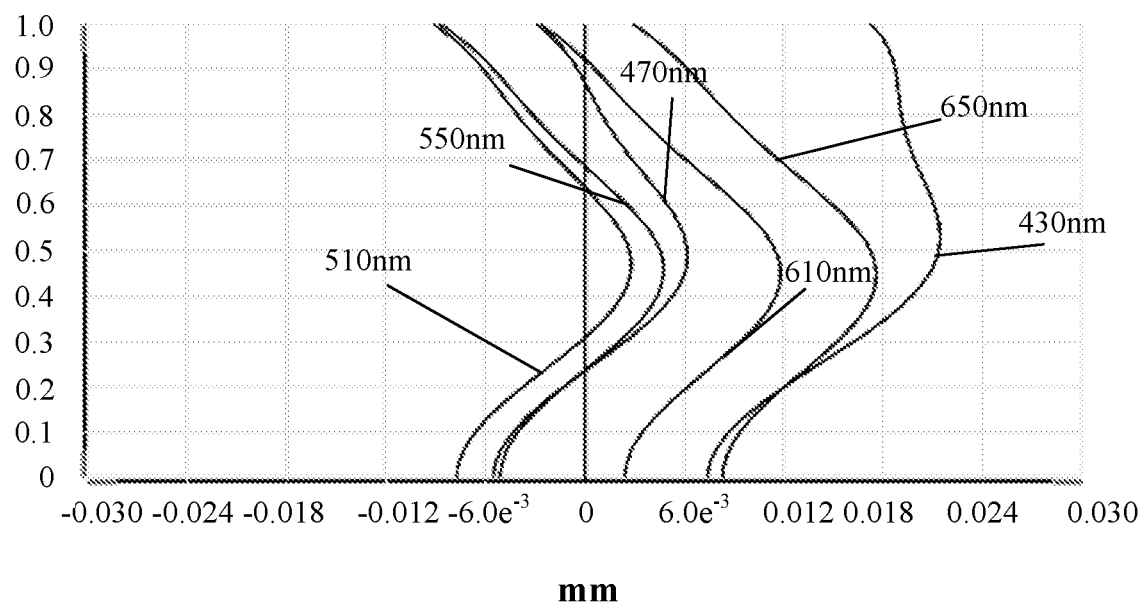
FIG. 2 is a schematic diagram of a longitudinal aberration of the camera optical lens shown in FIG. 1.
Figure 3:
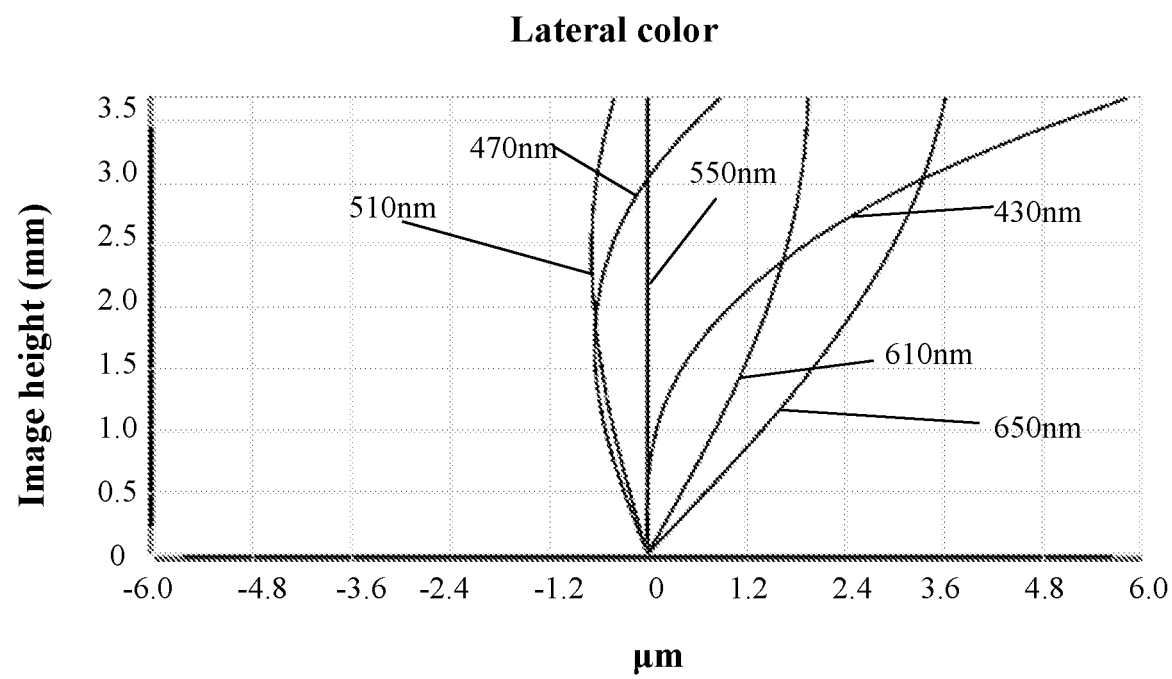
FIG. 3 is a schematic diagram of a lateral color of the camera optical lens shown in FIG. 1.
Figure 4:
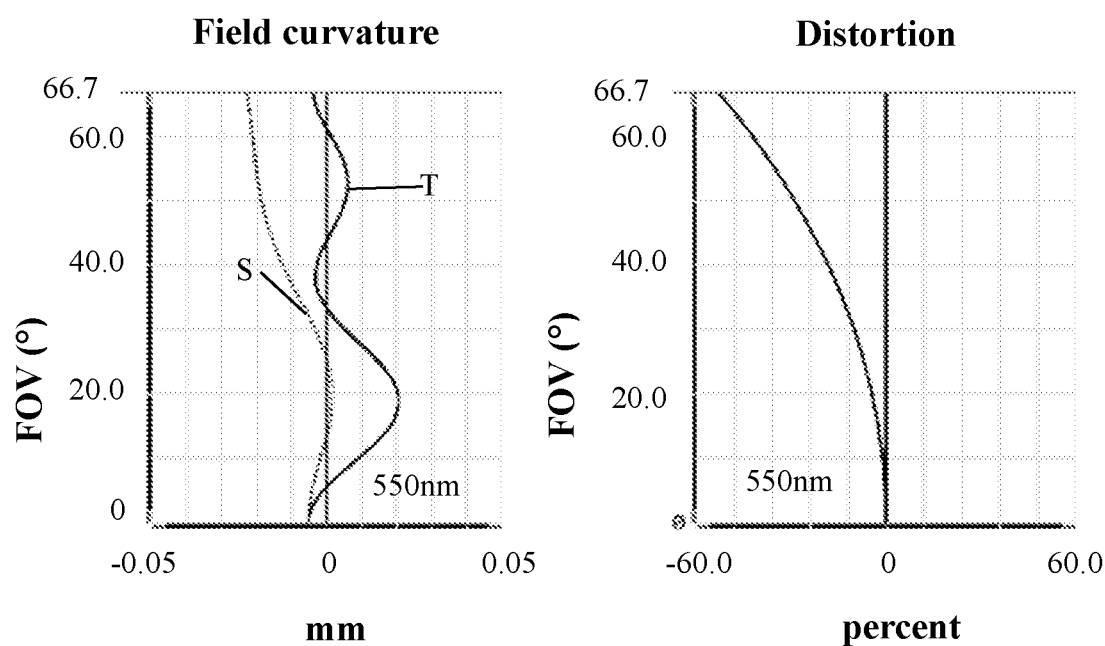
FIG. 4 is a schematic diagram of a field curvature and a distortion of the camera optical lens shown in FIG. 1.

FIG. 2 and FIG. 3 illustrate a longitudinal aberration and a lateral color with wavelengths of 650 nm, 610 nm, 550 nm, 510 nm, 470 nm and 430 nm after passing the camera optical lens 10 according to Embodiment 1, respectively. FIG. 4 illustrates a field curvature and a distortion with a wavelength of 550 nm after passing the camera optical lens 10 according to Embodiment 1. A field curvature S in FIG. 4 is a field curvature in a sagittal direction, and T is a field curvature in a tangential direction.

Table 9 in the following shows various values of Embodiments 1, 2, 3 and the contrasting embodiment and values corresponding to parameters which are specified in the conditions.

As shown in Table 9, Embodiment 1 satisfies the conditions.

In an embodiment, an entrance pupil diameter ENPD of the camera optical lens 10 is 1.87 mm, an image height IH of 1.0H is 3.690 mm, and an FOV (field of view) in a diagonal direction is 133.43°. Thus, the camera optical lens 10 satisfies a desire of design in large aperture, ultra-wide angle and miniaturization. Its on-axis and off-axis aberrations are fully corrected, thereby achieving excellent optical characteristics.

Embodiment 2

Embodiment 2 is basically the same as Embodiment 1 and involves symbols having the same meanings as Embodiment 1, and only differences therebetween will be described in the following.

Figure 5:
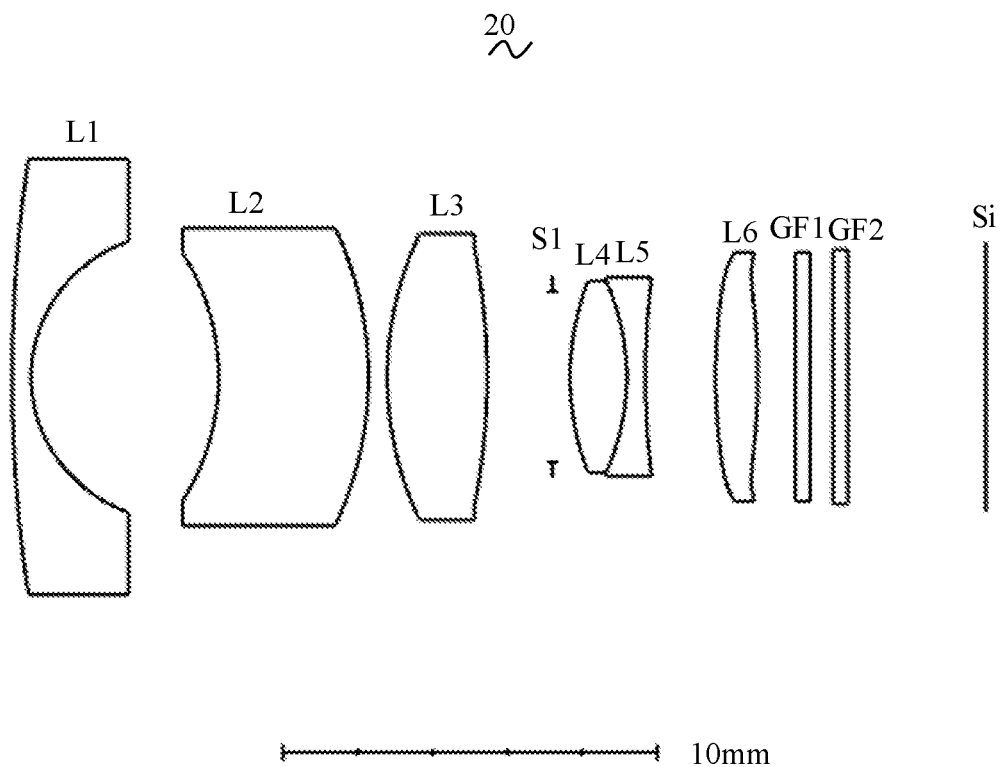
FIG. 5 is a schematic diagram of a structure of a camera optical lens according to Embodiment 2 of the present disclosure.

FIG. 5 is a camera optical lens 20 according to Embodiment 2 of the present disclosure.

Table 3 and Table 4 show design data of a camera optical lens 20 in Embodiment 2 of the present disclosure.

TABLE 3

| | R | | d | nd | | vd |
|---|---|---|---|---|---|---|
| S1 | ∞ | d0= | −14.426 | | | |
| R1 | 41.791 | d1= | 0.500 | nd1 | 1.6968 | v1 | 55.53 |
| R2 | 3.957 | d2= | 5.013 | | | |
| R3 | −6.453 | d3= | 4.000 | nd2 | 1.8348 | v2 | 42.73 |
| R4 | −9.778 | d4= | 0.501 | | | |
| R5 | 9.300 | d5= | 2.668 | nd3 | 1.6477 | v3 | 33.84 |
| R6 | −18.785 | d6= | 2.220 | | | |
| R7 | 7.434 | d7= | 1.511 | nd4 | 1.6204 | v4 | 60.37 |
| R8 | −6.519 | d8= | 0.000 | | | |
| R9 | −6.519 | d9= | 0.500 | nd5 | 1.9525 | v5 | 20.36 |
| R10 | 22.115 | d10= | 1.875 | | | |
| R11 | 16.615 | d11= | 1.131 | nd6 | 1.8017 | v6 | 40.63 |
| R12 | −16.615 | d12= | 1.000 | | | |
| R13 | ∞ | d13= | 0.400 | ndg1 | 1.5233 | vg1 | 54.52 |
| R14 | ∞ | d14= | 0.600 | | | |
| R15 | ∞ | d13= | 0.400 | ndg2 | 1.5168 | vg2 | 64.17 |
| R16 | ∞ | d14= | 3.692 | | | |

Table 4 shows aspherical surface data of each lens of the camera optical lens 20 in Embodiment 2 of the present disclosure.

TABLE 4

| | Conic coefficient | Aspheric surface coefficients | | | | | |
|---|---|---|---|---|---|---|---|
| | k | A4 | A6 | A8 | A10 | A12 | |
| R1 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 | 0.0000E+00 | 0.0000E+00 |
| R4 | 0.0000E+00 | 0.0000E+00 | 0.0000E+00 | 0.0000E+00 | 0.0000E+00 | 0.0000E+00 | 0.0000E+00 |
| R5 | 0.0000E+00 | 0.0000E+00 | 0.0000E+00 | 0.0000E+00 | 0.0000E+00 | 0.0000E+00 | 0.0000E+00 |
| R6 | 0.0000E+00 | 0.0000E+00 | 0.0000E+00 | 0.0000E+00 | 0.0000E+00 | 0.0000E+00 | 0.0000E+00 |
| R7 | 0.0000E+00 | 0.0000E+00 | 0.0000E+00 | 0.0000E+00 | 0.0000E+00 | 0.0000E+00 | 0.0000E+00 |
| R8 | 0.0000E+00 | 0.0000E+00 | 0.0000E+00 | 0.0000E+00 | 0.0000E+00 | 0.0000E+00 | 0.0000E+00 |
| R9 | 0.0000E+00 | 0.0000E+00 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 | 0.0000E+00 | 0.0000E+00 |
| R11 | 2.1975E−01 | −4.8682E−04 | 1.1823E−04 | −3.4128E−05 | 1.3024E−05 | −2.7013E−06 | 3.4363E−07 |
| R12 | −3.1490E+01 | −4.3575E−04 | −1.7547E−05 | 5.0023E−05 | −1.4111E−05 | 2.9721E−06 | −4.2549E−07 |

TABLE 4-continued

| | Conic coefficient | Aspheric surface coefficients | | | |
|---|---|---|---|---|---|
| | k | A14 | A16 | A18 | A20 |
| R1 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 |
| R4 | 0.0000E+00 | 0.0000E+00 | 0.0000E+00 | 0.0000E+00 | 0.0000E+00 |
| R5 | 0.0000E+00 | 0.0000E+00 | 0.0000E+00 | 0.0000E+00 | 0.0000E+00 |
| R6 | 0.0000E+00 | 0.0000E+00 | 0.0000E+00 | 0.0000E+00 | 0.0000E+00 |
| R7 | 0.0000E+00 | 0.0000E+00 | 0.0000E+00 | 0.0000E+00 | 0.0000E+00 |
| R8 | 0.0000E+00 | 0.0000E+00 | 0.0000E+00 | 0.0000E+00 | 0.0000E+00 |
| R9 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 |
| R11 | 2.1975E-01 | 3.4363E-07 | -2.5272E-08 | 9.8701E-10 | -1.5479E-11 |
| R12 | -3.1490E+01 | -4.2549E-07 | 3.9803E-08 | -2.1207E-09 | 4.8905E-11 |

Figure 6:
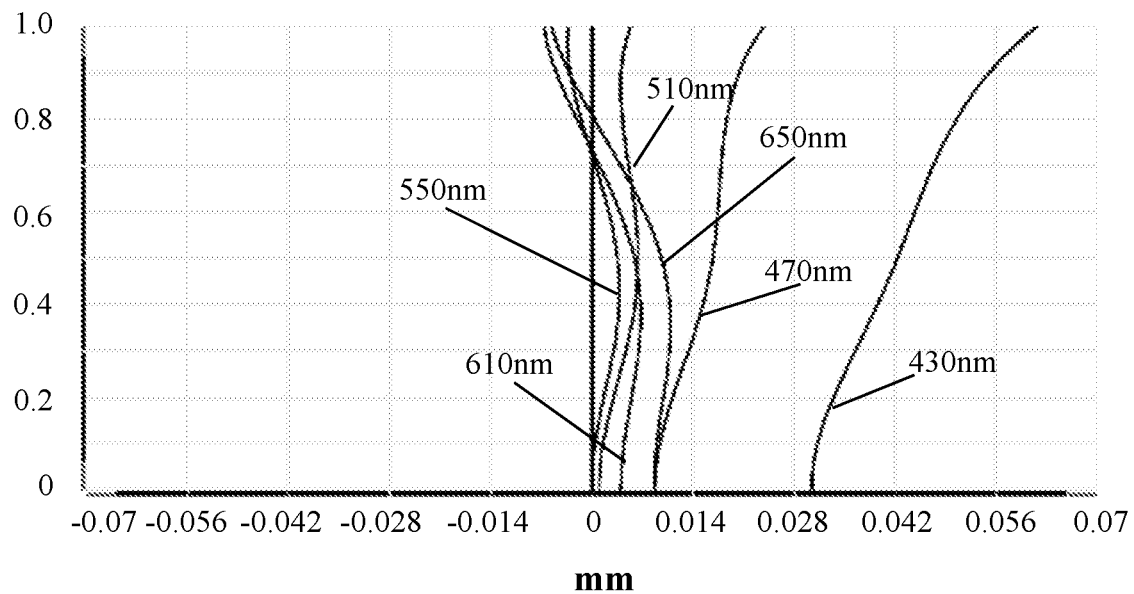
FIG. 6 is a schematic diagram of a longitudinal aberration of the camera optical lens shown in FIG. 5.
Figure 7:
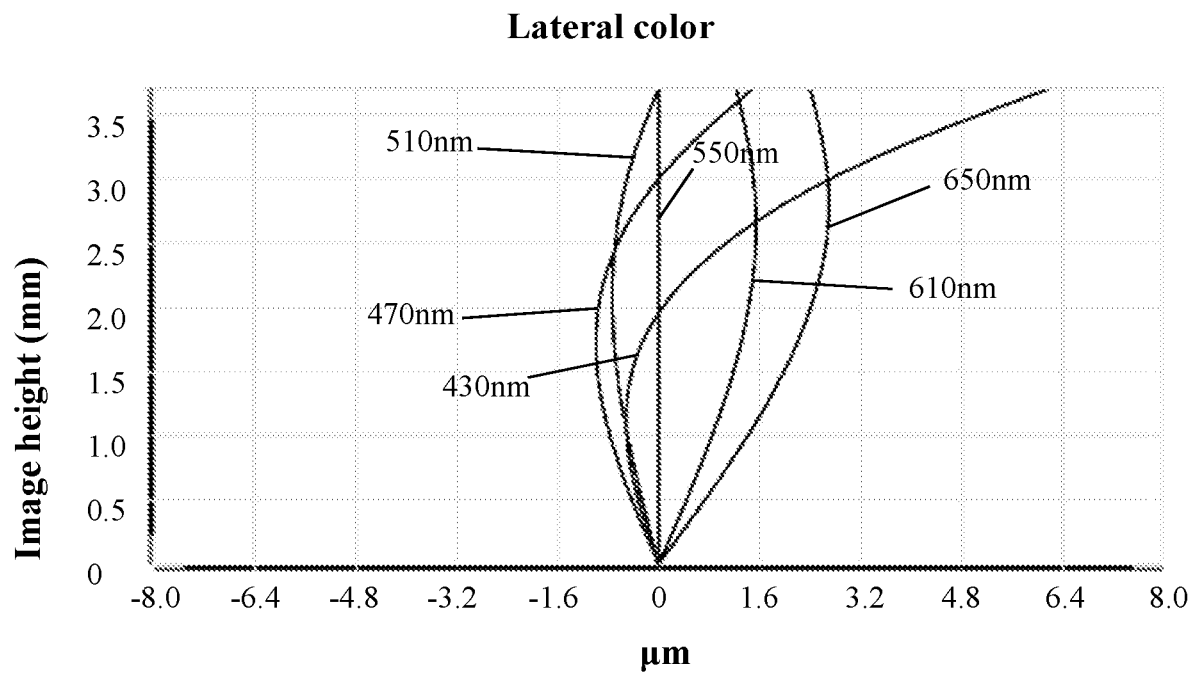
FIG. 7 is a schematic diagram of a lateral color of the camera optical lens shown in FIG. 5.
Figure 8:
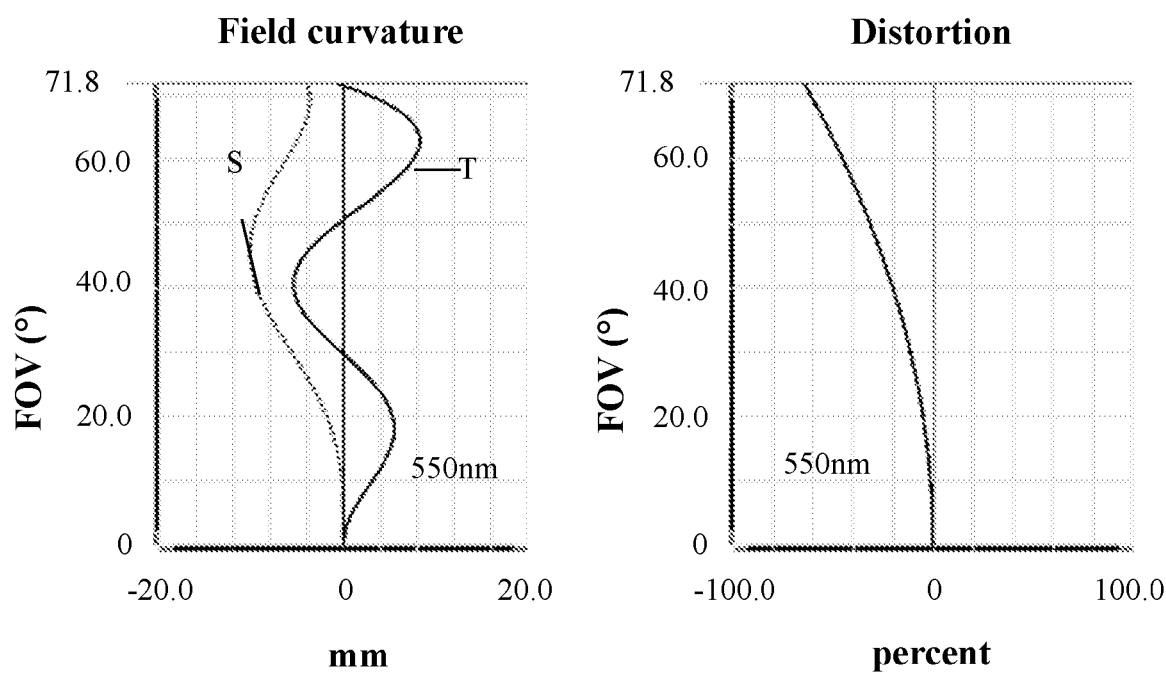
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 650 nm, 610 nm, 550 nm, 510 nm, 470 nm and 430 nm after passing the camera optical lens 20 according to Embodiment 2. FIG. 8 illustrates a field curvature and a distortion of light with a wavelength of 550 nm after passing the camera optical lens 20 according to Embodiment 2. A field curvature S in FIG. 8 is a field curvature in a sagittal direction, and T is a field curvature in a tangential direction.

As shown in Table 9, Embodiment 2 satisfies the conditions.

In an embodiment, an entrance pupil diameter ENPD of the camera optical lens 20 is 1.892 mm, an image height IH of 1.0H is 3.690 mm, and an FOV (field of view) in the diagonal direction is 143.600. Thus, the camera optical lens 20 satisfies a desire of design in large aperture, ultra-wide angle and miniaturization. Its on-axis and off-axis aberrations are fully corrected, thereby achieving excellent optical characteristics.

Embodiment 3

Embodiment 3 is basically the same as Embodiment 1 and involves symbols having the same meanings as Embodiment 1, and only differences therebetween will be described in the following.

Figure 9:
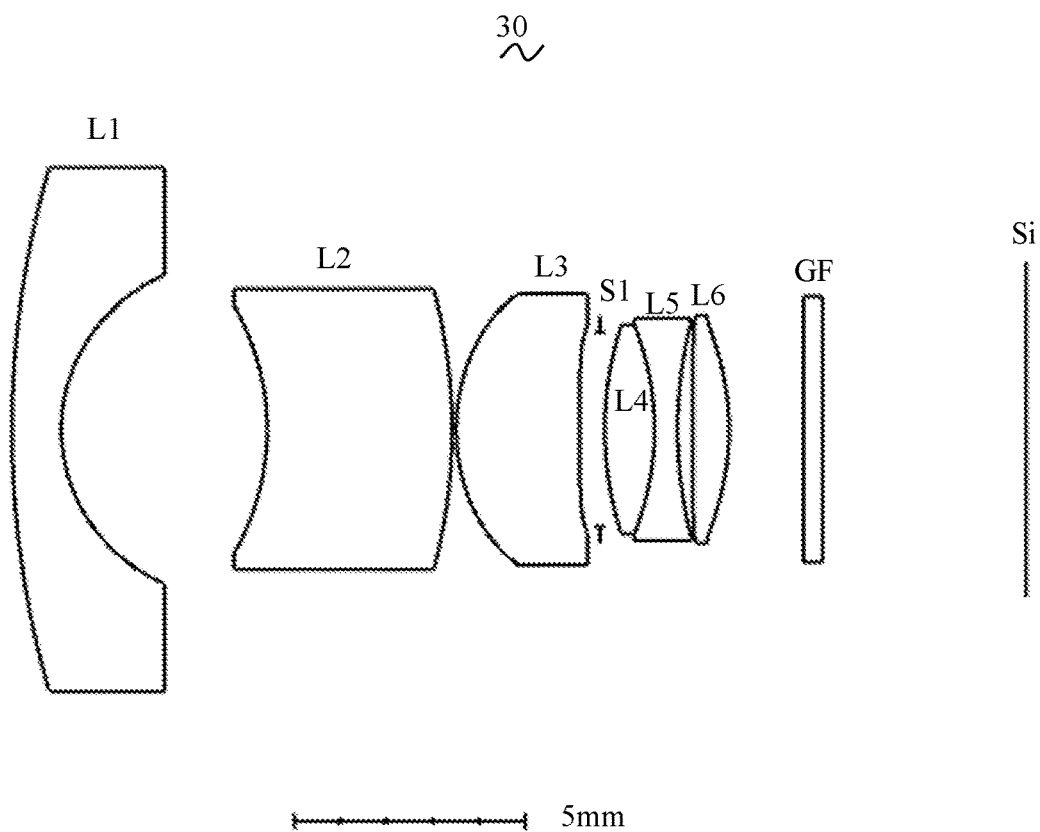
FIG. 9 is a schematic diagram of a structure of a camera optical lens according to Embodiment 3 of the present disclosure.

FIG. 9 is a camera optical lens 30 according to Embodiment 3 of the present disclosure.

Table 5 and Table 6 show design data of the camera optical lens 30 in Embodiment 3 of the present disclosure.

TABLE 5

| | R | d | nd | vd |
|---|---|---|---|---|
| S1 | ∞ | d0= -12.690 | | |
| R1 | 21.268 | d1= 1.063 | nd1 1.6968 | v1 55.53 |
| R2 | 3.731 | d2= 4.439 | | |
| R3 | -5.580 | d3= 4.000 | nd2 1.8348 | v2 42.73 |
| R4 | -12.298 | d4= 0.089 | | |
| R5 | 4.485 | d5= 2.664 | nd3 1.6477 | v3 33.84 |
| R6 | -89.258 | d6= 0.534 | | |
| R7 | 7.666 | d7= 1.075 | nd4 1.6204 | v4 60.37 |
| R8 | -6.390 | d8= 0.000 | | |
| R9 | -6.390 | d9= 0.500 | nd5 1.9525 | v5 20.36 |
| R10 | 9.886 | d10= 0.331 | | |
| R11 | 1183.644 | d11= 0.781 | nd6 1.8017 | v6 40.63 |
| R12 | -5.948 | d12= 1.600 | | |
| R13 | ∞ | d13= 0.400 | ndg 1.5168 | vg 64.17 |
| R14 | ∞ | d14= 4.418 | | |

Table 6 shows aspherical surface data of each lens of the camera optical lens 30 in Embodiment 3 of the present disclosure.

TABLE 6

| | Conic coefficient | Aspherical surface coefficients | | | | |
|---|---|---|---|---|---|---|
| | k | A4 | A6 | A8 | A10 | A12 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 | 0.0000E+00 |
| R4 | 0.0000E+00 | 0.0000E+00 | 0.0000E+00 | 0.0000E+00 | 0.0000E+00 | 0.0000E+00 |
| R5 | 2.2721E-01 | 3.0254E-04 | 5.8380E-05 | 2.8124E-05 | -1.7774E-05 | 6.2943E-06 |
| R6 | -3.2334E+04 | -5.0419E-05 | 4.6237E-03 | -3.3653E-03 | 1.7712E-03 | -6.1309E-04 |
| R7 | 0.0000E+00 | 0.0000E+00 | 0.0000E+00 | 0.0000E+00 | 0.0000E+00 | 0.0000E+00 |
| R8 | 0.0000E+00 | 0.0000E+00 | 0.0000E+00 | 0.0000E+00 | 0.0000E+00 | 0.0000E+00 |
| R9 | 0.0000E+00 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 | 0.0000E+00 |
| R11 | -1.9900E+02 | 2.8531E-04 | 2.9846E-05 | -6.9317E-05 | 6.9444E-05 | -3.5820E-05 |
| R12 | -4.4643E+00 | -1.7891E-03 | -1.7342E-04 | 4.1375E-04 | -3.1371E-04 | 1.3694E-04 |

| | Conic coefficient | Aspherical surface coefficients | | | | |
|---|---|---|---|---|---|---|
| | k | A14 | A16 | A18 | A20 | A12 |
| R1 | 0.0000E+00 | 0.0000E+00 | 0.0000E+00 | 0.0000E+00 | 0.0000E+00 | |

TABLE 6-continued

| | | | | | |
|---|---|---|---|---|---|
| R2 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 |
| R4 | 0.0000E+00 | 0.0000E+00 | 0.0000E+00 | 0.0000E+00 | 0.0000E+00 |
| R5 | 2.2721E−01 | −1.2315E−06 | 1.3947E−07 | −8.5164E−09 | 2.2117E−10 |
| R6 | −3.2334E+04 | 1.3796E−04 | −1.9250E−05 | 1.5067E−06 | −4.9996E−08 |
| R7 | 0.0000E+00 | 0.0000E+00 | 0.0000E+00 | 0.0000E+00 | 0.0000E+00 |
| R8 | 0.0000E+00 | 0.0000E+00 | 0.0000E+00 | 0.0000E+00 | 0.0000E+00 |
| R9 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 |
| R11 | −1.9900E+02 | 1.0607E−05 | −1.7195E−06 | 1.4366E−07 | −4.6473E−09 |
| R12 | −4.4643E+00 | −3.6249E−05 | 5.8008E−06 | −5.1458E−07 | 1.9593E−08 |

Figure 10:
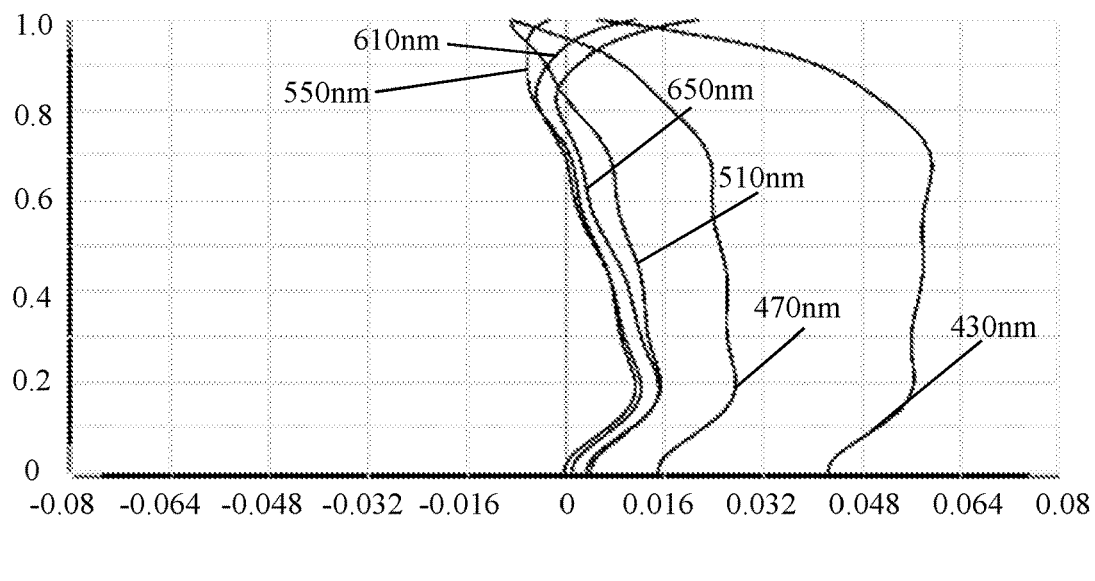
FIG. 10 is a schematic diagram of a longitudinal aberration of the camera optical lens shown in FIG. 9.
Figure 11:
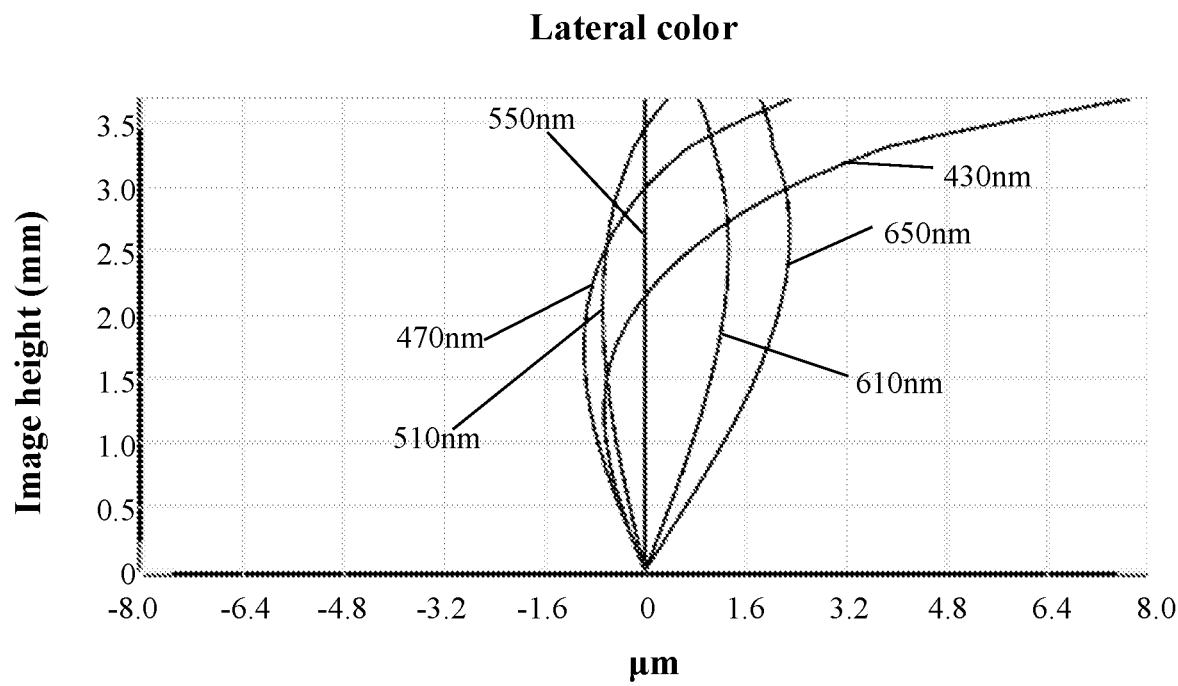
FIG. 11 is a schematic diagram of a lateral color of the camera optical lens shown in FIG. 9.
Figure 12:
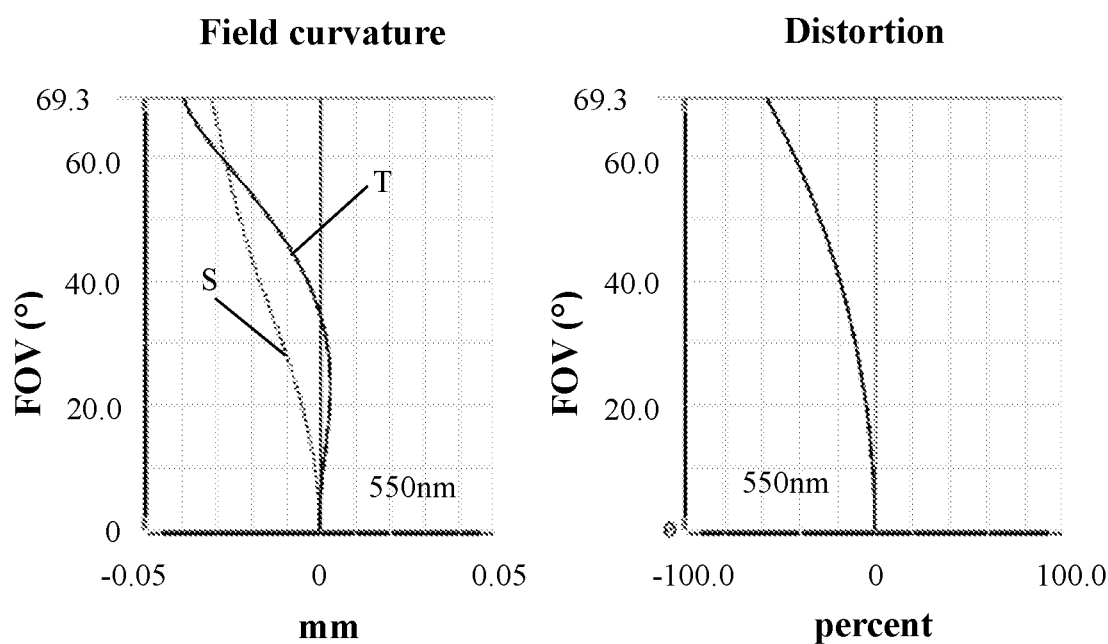
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 650 nm, 610 nm, 550 nm, 510 nm, 470 nm and 430 nm after passing the camera optical lens 30 according to Embodiment 3. FIG. 12 illustrates a field curvature and a distortion of light with a wavelength of 550 nm after passing the camera optical lens 30 according to Embodiment 3. A field curvature S in FIG. 12 is a field curvature in a sagittal direction, and T is a field curvature in a tangential direction.

As shown in Table 9, Embodiment 3 satisfies the conditions.

In an embodiment, an entrance pupil diameter ENPD of the camera optical lens 30 is 1.832 mm, an image height IH of 1.0H is 3.690 mm, and an FOV (field of view) in the diagonal direction is 138.650. Thus, the camera optical lens 30 satisfies a desire of design in large aperture, ultra-wide angle and miniaturization. Its on-axis and off-axis aberrations are fully corrected, thereby achieving excellent optical characteristics.

Contrasting Embodiment

The contrasting embodiment involves symbols having the same meanings as Embodiment 1, and only differences therebetween will be described in the following.

Figure 13:
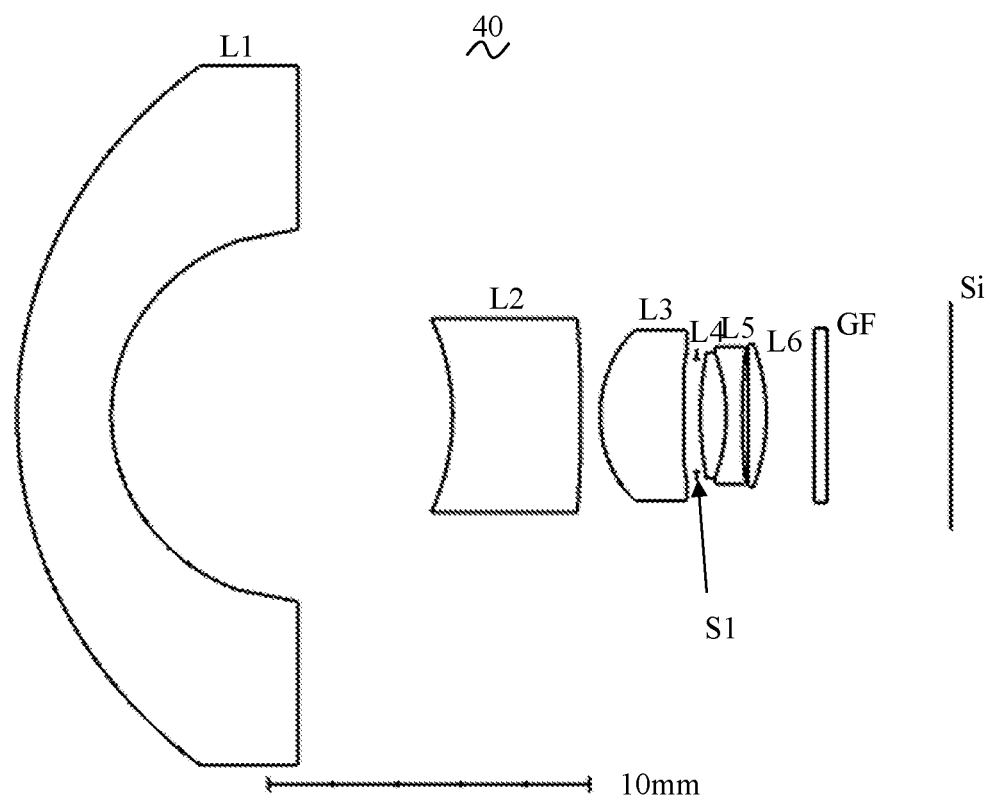
FIG. 13 is a schematic diagram of a structure of a camera optical lens according to a contrasting embodiment.

FIG. 13 is a camera optical lens 40 according to the contrasting embodiment.

Table 7 and Table 8 show design data of a camera optical lens 40 in the contrasting embodiment of the present disclosure.

TABLE 7

| | R | d | | nd | | vd |
|---|---|---|---|---|---|---|
| S1 | ∞ | d0= | −21.196 | | | |
| R1 | 14.140 | d1= | 2.927 | nd1 | 1.6968 | v1 | 55.53 |
| R2 | 6.041 | d2= | 10.640 | | | |
| R3 | −7.764 | d3= | 4.000 | nd2 | 1.8348 | v2 | 42.73 |
| R4 | −47.663 | d4= | 0.606 | | | |
| R5 | 4.332 | d5= | 2.606 | nd3 | 1.6477 | v3 | 33.84 |
| R6 | −70.306 | d6= | 0.522 | | | |
| R7 | 11.091 | d7= | 0.800 | nd4 | 1.6204 | v4 | 60.37 |
| R8 | −6.059 | d8= | 0.000 | | | |
| R9 | −6.059 | d9= | 0.500 | nd5 | 1.9525 | v5 | 20.36 |
| R10 | 23.180 | d10= | 0.172 | | | |
| R11 | 962.777 | d11= | 0.583 | nd6 | 1.8017 | v6 | 40.63 |
| R12 | −6.582 | d12= | 1.500 | | | |
| R13 | ∞ | d13= | 0.400 | ndg | 1.5168 | vg | 64.17 |
| R14 | ∞ | d14= | 3.850 | | | |

Table 8 shows aspherical surface data of each lens of the camera optical lens 40 in the contrasting embodiment of the present disclosure.

TABLE 8

| | Conic coefficient | Aspherical surface coefficients | | | | |
|---|---|---|---|---|---|---|
| | k | A4 | A6 | A8 | A10 | A12 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 | 0.0000E+00 |
| R4 | 0.0000E+00 | 0.0000E+00 | 0.0000E+00 | 0.0000E+00 | 0.0000E+00 | 0.0000E+00 |
| R5 | 1.9217E−01 | −9.0718E−05 | 3.7306E−04 | −2.5206E−04 | 1.0750E−04 | −2.5182E−05 |
| R6 | −3.1736E+04 | −3.9608E−03 | 1.2011E−02 | −1.0537E−02 | 6.0888E−03 | −2.2563E−03 |
| R7 | 0.0000E+00 | 0.0000E+00 | 0.0000E+00 | 0.0000E+00 | 0.0000E+00 | 0.0000E+00 |
| R8 | 0.0000E+00 | 0.0000E+00 | 0.0000E+00 | 0.0000E+00 | 0.0000E+00 | 0.0000E+00 |
| R9 | 0.0000E+00 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 | 0.0000E+00 |
| R11 | −1.5682E+01 | 1.4639E−04 | −4.8254E−04 | 1.6396E−03 | −1.5936E−03 | 7.7029E−04 |
| R12 | −4.6679E+00 | 1.8886E−03 | −7.6422E−03 | 8.5589E−03 | −5.4796E−03 | 2.1186E−03 |

| | Conic coefficient | Aspherical surface coefficients | | | |
|---|---|---|---|---|---|
| | k | A14 | A16 | A18 | A20 |
| R1 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 |
| R4 | 0.0000E+00 | 0.0000E+00 | 0.0000E+00 | 0.0000E+00 | 0.0000E+00 |
| R5 | 1.9217E−01 | 3.4662E−06 | −2.7389E−07 | 1.1300E−08 | −1.7648E−10 |

TABLE 8-continued

| | | | | | |
|---|---|---|---|---|---|
| R6 | −3.1736E+04 | 5.3427E−04 | −7.7928E−05 | 6.3724E−06 | −2.2287E−07 |
| R7 | 0.0000E+00 | 0.0000E+00 | 0.0000E+00 | 0.0000E+00 | 0.0000E+00 |
| R8 | 0.0000E+00 | 0.0000E+00 | 0.0000E+00 | 0.0000E+00 | 0.0000E+00 |
| R9 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 |
| R11 | −1.5682E+01 | −2.0915E−04 | 3.2500E−05 | −2.6988E−06 | 9.3081E−08 |
| R12 | −4.6679E+00 | −5.0168E−04 | 7.1122E−05 | −5.5383E−06 | 1.8240E−07 |

Figure 14:
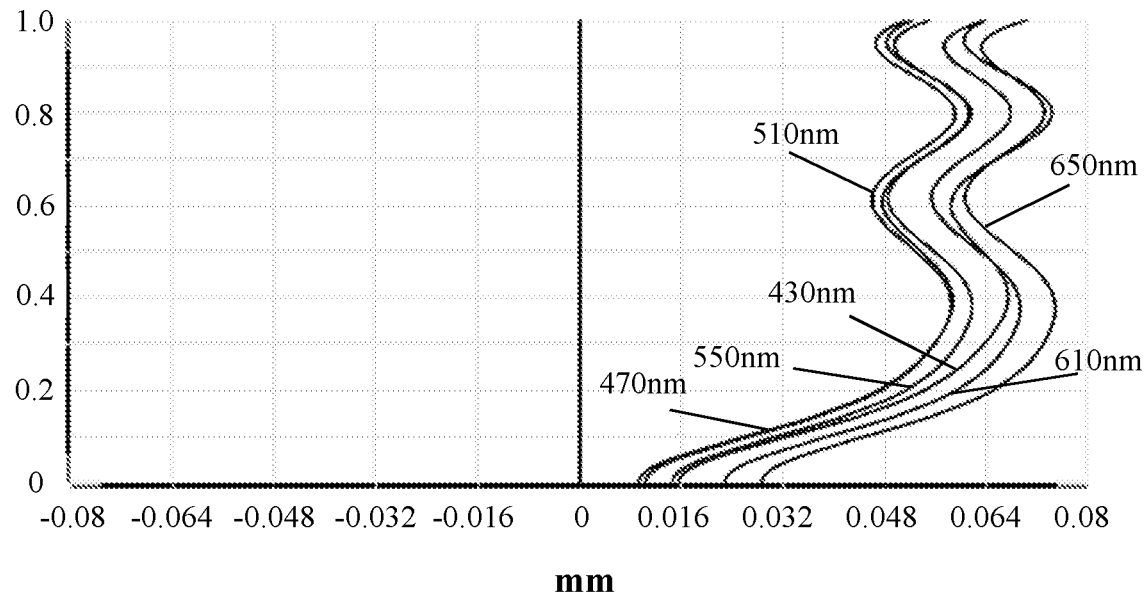
FIG. 14 is a schematic diagram of a longitudinal aberration of the camera optical lens shown in FIG. 13.
Figure 15:
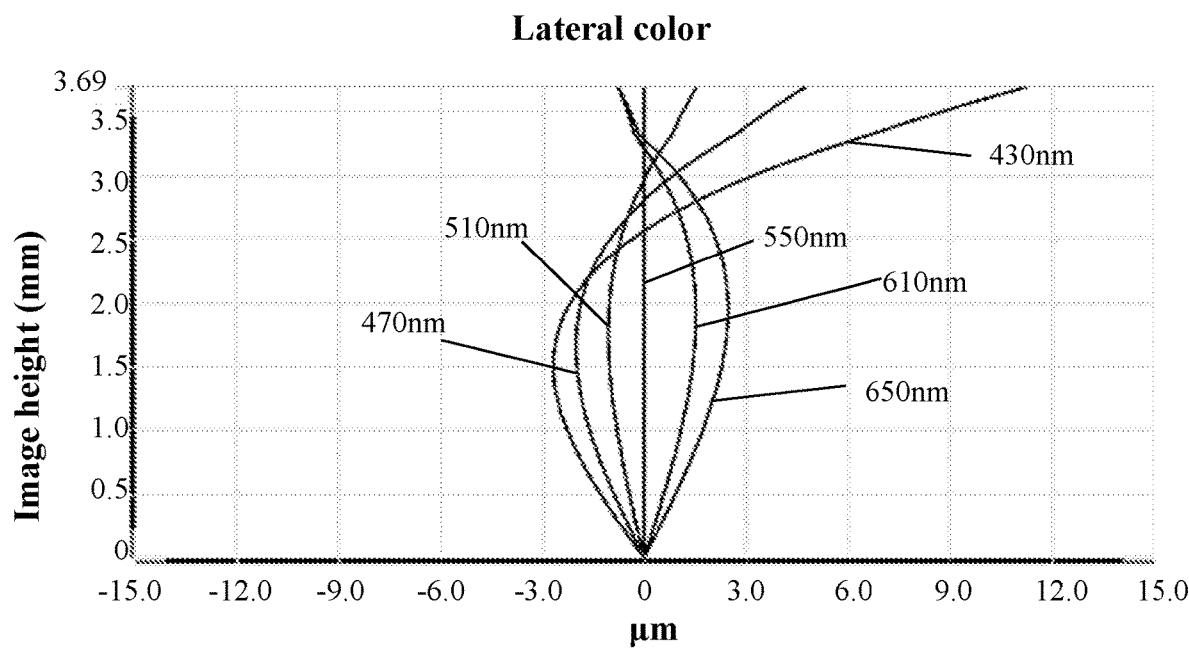
FIG. 15 is a schematic diagram of a lateral color of the camera optical lens shown in FIG. 13.
Figure 16:
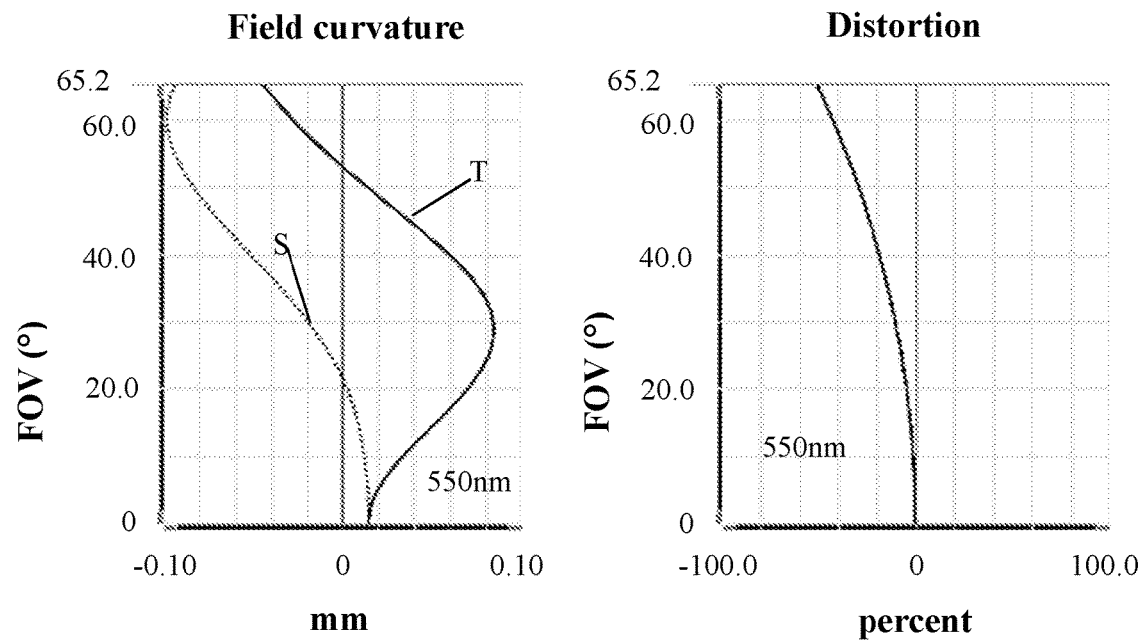
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 650 nm, 610 nm, 550 nm, 510 nm, 470 nm and 430 nm after passing the camera optical lens 40 according to the contrasting embodiment. FIG. 16 illustrates a field curvature and a distortion of light with a wavelength of 550 nm after passing the camera optical lens 40 according to the contrasting embodiment. A field curvature S in FIG. 16 is a field curvature in a sagittal direction, and T is a field curvature in a tangential direction.

Table 9 in the following lists values corresponding to the respective conditions in the contrasting embodiment according to the above conditions. Obviously, the camera optical lens 40 in the contrasting embodiment does not satisfy the above condition of 2.50≤f2/f1≤8.00 and has a long total optical length.

In the contrasting embodiment, an entrance pupil diameter ENPD of the camera optical lens 40 is 1.939 mm, an image height IH of 1.0H is 3.690 mm, and an FOV (field of view) in the diagonal direction is 130.363. Thus, the camera optical lens 40 does not satisfy a desire of design in large aperture, ultra-wide angle and miniaturization.

TABLE 9

| Parameters and conditions | Embodiment 1 | Embodiment 2 | Embodiment 3 | Contrasting Embodiment |
|---|---|---|---|---|
| f2/f1 | 6.873 | 7.979 | 2.520 | 0.654 |
| f45/f | −16.944 | −73.053 | −5.020 | −7.399 |
| d5/d6 | 2.122 | 1.202 | 4.989 | 4.992 |
| R6/R5 | −3.541 | −2.020 | −19.901 | −16.229 |
| d2/d4 | 45.022 | 10.006 | 49.876 | 17.558 |
| (R11 + R12)/(R11 − R12) | 0.076 | 0.000 | 0.990 | 0.986 |
| EFL/IH | 0.912 | 0.923 | 0.893 | 0.946 |
| f | 3.366 | 3.405 | 3.297 | 3.490 |
| f1 | −5.509 | −6.283 | −6.634 | −17.715 |
| f2 | −37.863 | −50.135 | −16.718 | −11.585 |
| f3 | 8.183 | 9.916 | 6.627 | 6.349 |
| f4 | 5.552 | 5.821 | 5.767 | 6.408 |
| f5 | −4.397 | −5.188 | −3.973 | −4.950 |
| f6 | 7.686 | 10.468 | 7.346 | 8.114 |
| f45 | −57.035 | −248.746 | −16.551 | −25.823 |
| FNO | 1.800 | 1.800 | 1.800 | 1.800 |
| TTL | 21.002 | 26.011 | 21.894 | 29.106 |
| IH | 3.690 | 3.690 | 3.690 | 3.690 |
| FOV | 133.430 | 143.600 | 138.650 | 130.360 |

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. A camera optical lens comprising, from an object side to an image side:
   a first lens having a negative refractive power;
   a second lens having a negative refractive power;
   a third lens having a positive refractive power;
   a fourth lens having a positive refractive power;
   a fifth lens having a negative refractive power; and
   a sixth lens having a positive refractive power;
   wherein the camera optical lens satisfies following conditions:

$2.50 \leq f2/f1 \leq 8.00$;

$f45/f \leq -5.00$;

$1.20 \leq d5/d6 \leq 5.00$; and $-20.00 \leq R6/R5 \leq -2.00$;

where
   f denotes a focal length of the camera optical lens;
   f1 denotes a focal length of the first lens;
   f2 denotes a focal length of the second lens;
   f45 denotes a combined focal length of the fourth lens and the fifth lens;
   d5 denotes an on-axis thickness of the third lens;
   d6 denotes an on-axis distance from an image-side surface of the third lens to an object-side surface of the fourth lens;
   R5 denotes a central curvature radius of an object-side surface of the third lens; and
   R6 denotes a central curvature radius of the image-side surface of the third lens.

2. The camera optical lens according to claim 1 further satisfying following condition:

$10.00 \leq d2/d4 \leq 50.00$;

where
   d2 denotes an on-axis distance from an image-side surface of the first lens to an object-side surface of the second lens; and
   d4 denotes an on-axis distance from an image-side surface of the second lens to the object-side surface of the third lens.

3. The camera optical lens according to claim 1 further satisfying following condition:

$0.00 \leq (R11+R12)/(R11-R12) \leq 1.00$;

where
   R11 denotes a central curvature radius of an object-side surface of the sixth lens; and
   R12 denotes a central curvature radius of an image-side surface of the sixth lens.

4. The camera optical lens according to claim 1 further satisfying following condition:

$EFL/IH \leq 1.00$;

where
   EFL denotes an effective focal length of the camera optical lens; and
   IH denotes an image height of the camera optical lens.

5. The camera optical lens according to claim 1, wherein an object-side surface of the first lens is convex in a paraxial region and an image-side surface of the first lens is concave in the paraxial region; and the camera optical lens further satisfies following conditions:

$-4.02 \leq f1/f \leq -1.09$;

$0.60 \leq (R1+R2)/(R1-R2) \leq 2.14$; and $0.01 \leq d1/TTL \leq 0.09$;

where

TTL denotes a total optical length from the object-side surface of the first lens to an image surface of the camera optical lens along an optical axis;
R1 denotes a central curvature radius of the object-side surface of the first lens;
R2 denotes a central curvature radius of the image-side surface of the first lens; and
d1 denotes an on-axis thickness of the first lens.

6. The camera optical lens according to claim 1, wherein an object-side surface of the second lens is concave in a paraxial region and an image-side surface of the second lens is convex in the paraxial region; and
the camera optical lens further satisfies following conditions:

$-29.45 \leq f2/f \leq -3.38$;

$-10.81 \leq (R3+R4)/(R3-R4) \leq -1.77$; and $0.06 \leq d3/TTL \leq 0.27$;

where

TTL denotes a total optical length from an object-side surface of the first lens to an image surface of the camera optical lens along an optical axis;
R3 denotes a central curvature radius of the object-side surface of the second lens;
R4 denotes a central curvature radius of the image-side surface of the second lens; and
d3 denotes an on-axis thickness of the second lens.

7. The camera optical lens according to claim 1, wherein the object-side surface of the third lens is convex in a paraxial region and the image-side surface of the third lens is concave in the paraxial region; and
the camera optical lens further satisfies following conditions:

$1.01 \leq f3/f \leq 4.37$;

$-1.81 \leq (R5+R6)/(R5-R6) \leq -0.23$; and $0.05 \leq d5/TTL \leq 0.18$;

where

TTL denotes a total optical length from an object-side surface of the first lens to an image surface of the camera optical lens along an optical axis; and
f3 denotes a focal length of the third lens.

8. The camera optical lens according to claim 1, wherein an object-side surface of the fourth lens is convex in a paraxial region and an image-side surface of the fourth lens is convex in the paraxial region; and the camera optical lens further satisfies following conditions:

$0.82 \leq f4/f \leq 2.62$;

$0 \leq (R7+R8)/(R7-R8) \leq 0.14$; and $0.02 \leq d7/TTL \leq 0.14$;

where

TTL denotes a total optical length from an object-side surface of the first lens to an image surface of the camera optical lens along an optical axis;
f4 denotes a focal length of the fourth lens;
R7 denotes a central curvature radius of the object-side surface of the fourth lens;
R8 denotes a central curvature radius of the image-side surface of the fourth lens; and
d7 denotes an on-axis thickness of the fourth lens.

9. The camera optical lens according to claim 1, wherein an object-side surface of the fifth lens is concave in a paraxial region and an image-side surface of the fifth lens is concave in the paraxial region, and
the camera optical lens further satisfies following conditions:

$-3.05 \leq f5/f \leq -0.80$;

$-1.09 \leq (R9+R10)/(R9-R10) \leq -0.14$; and $0.01 \leq d9/TTL \leq 0.04$ where TTL denotes a total optical length from an object-side surface of the first lens to an image surface of the camera optical lens along an optical axis;
f4 denotes a focal length of the fifth lens;
R9 denotes a central curvature radius of the object-side surface of the fifth lens;
R10 denotes a central curvature radius of the image-side surface of the fifth lens; and
d9 denotes an on-axis thickness of the fifth lens.

10. The camera optical lens according to claim 1, wherein an object-side surface of the sixth lens is convex in a paraxial region and an image-side surface of the sixth lens is convex in the paraxial region, and
the camera optical lens further satisfies following conditions:

$1.11 \leq f6/f \leq 4.61$; and $0.02 \leq d11/TTL \leq 0.09$;

where

TTL denotes a total optical length from an object-side surface of the first lens to an image surface of the camera optical lens along an optical axis;
f6 denotes a focal length of the sixth lens; and
d11 denotes an on-axis thickness of the sixth lens.

11. The camera optical lens according to claim 1, wherein the first lens, the second lens, the third lens, the fourth lens, the fifth lens and the sixth lens are glass.

* * * * *